(12) United States Patent
Usoro

(10) Patent No.: US 6,415,901 B1
(45) Date of Patent: Jul. 9, 2002

(54) HYDRAULIC-APPLIED MAGNETIC-RELEASED TORQUE TRANSMITTER

(75) Inventor: Patrick Benedict Usoro, Troy, MI (US)

(73) Assignee: General Motor Corporation, Detroit, MI (US)

( * ) Notice: Subject to any disclaimer, the term of this patent is extended or adjusted under 35 U.S.C. 154(b) by 3 days.

(21) Appl. No.: 09/676,570

(22) Filed: Oct. 2, 2000

(51) Int. Cl.$^7$ .......................................... F16D 25/0638
(52) U.S. Cl. .............................. 192/85 AA; 192/70.14; 192/101; 188/72.3; 188/72.4
(58) Field of Search .......................... 192/70.11, 70.14, 192/70.28, 85 AA, 84.3, 90, 101, 107 M, FOR 100; 188/71.5, 72.3, 72.4

(56) References Cited

U.S. PATENT DOCUMENTS

| 5,046,404 A | * | 9/1991 | Schnorenberg, Jr. ... 188/72.3 X |
| 5,115,898 A | * | 5/1992 | Lehle et al. .......... 192/70.11 X |
| 5,714,820 A | * | 2/1998 | Mitsuhashi et al. .... 192/84.3 X |

FOREIGN PATENT DOCUMENTS

| JP | 62-127519 A | * | 6/1987 | ............ 192/107 M |
| JP | 5-141444 A | * | 6/1993 | ............ 192/85 AA |

* cited by examiner

Primary Examiner—Richard M. Lorence
(74) Attorney, Agent, or Firm—Jeffrey A. Sedlar; George A. Grove

(57) ABSTRACT

A selectively engageable torque transmitting mechanism has an apply piston, a plurality of first friction plates, a plurality of second friction plates, and a backing plate. The first friction plates are drivingly connected with one transmission member and the second friction plates are drivingly connected with another transmission member and alternately spaced with the first friction members. The friction plates are generally annular members having axial faces that are magnetized with opposite polarities. The magnetized faces of the first friction plates are disposed adjacent like polarity faces of the second friction plates to enforce separation thereof when the torque transmitting mechanism is in a disengaged state. The apply piston of the torque transmitting mechanism also has an annular face with a magnetic polarity disposed in opposition to an oppositely polarized surface on an adjacent member of the torque transmitting mechanism.

5 Claims, 2 Drawing Sheets

HYDRAULIC-APPLIED MAGNETIC-RELEASED TORQUE TRANSMITTER

TECHNICAL FIELD

This invention relates to selectively-operable, frictionally-engaged torque transmitting mechanisms.

BACKGROUND OF THE INVENTION

Traditionally, multi-plate torque transmitting mechanisms used in automatic transmissions are applied by a hydraulically-actuated piston. The piston is released by a spring assembly that is positioned between the piston and a spring retainer. Adjacent friction plates are free to rotate relatively. However, in many instances, the adjacent plates retain a slight contact resulting is a power loss in the transmission commonly termed "drag" or "spin loss". This results in a reduction of the overall efficiency in the transmission.

It has been proposed to physically separate the adjacent plates during disengagement by placing springs between commonly grounded plates. For example, the first and third plates are separated by one or more springs, and the second and fourth plates are separated by one or more springs. It has also been proposed to separate adjacent friction plates with interposed springs. This, however, increases the drag loss between adjacent plates more than the separation of commonly grounded plates., The force in these separating springs is overcome by the hydraulic apply force on the piston during engagement of the torque transmitting mechanism. These separator springs add weight and complexity to the transmission assembly.

An alternative to using separator springs is to alternate a flat plate and a wave plate. The wave plate acts as a spring to separate the adjacent plates. The wave plate will have slight contact with the adjacent flat plate and does not therefore completely eliminate the drag therebetween. Other solutions, such as providing grooved plates to enforce a fluid layer between the plates, have also been utilized. This approach has not been entirely successful.

SUMMARY OF THE INVENTION

It is an object of the present invention to provide an improved torque transmitting mechanism having an integral plate separating force to enforce the separation of adjacent plates during disengagement of the torque transmitting mechanism.

In one aspect of the invention, the adjacent friction surfaces of the torque transmitting plates have like magnetic properties. In another aspect of the present invention, each friction plate is permanently magnetized to have a north pole facing one friction surface and a south pole facing the other friction surface.

In yet another aspect of the present invention, permanent magnets are installed in each friction plate, made of magnetizable material, to provide a uniform level of magnetic separating force between adjacent plates. In still another aspect of the present invention, permanent magnets are inserted in nonmagnetic friction plates to provide a magnetic separating force between adjacent friction plates. In a further aspect of the present invention, the apply piston has one or more magnets applied thereto to create a magnetic separating force with an adjacent member of the torque transmitting mechanism such as a friction plate or a balance dam or other axially stationary component of the torque transmitter. In yet a further aspect of the present invention, a magnetic separating force is utilized to reduce the drag force between adjacent plate members of a torque transmitting mechanism.

DESCRIPTION OF THE PREFERRED EMBODIMENT

Figure 1:
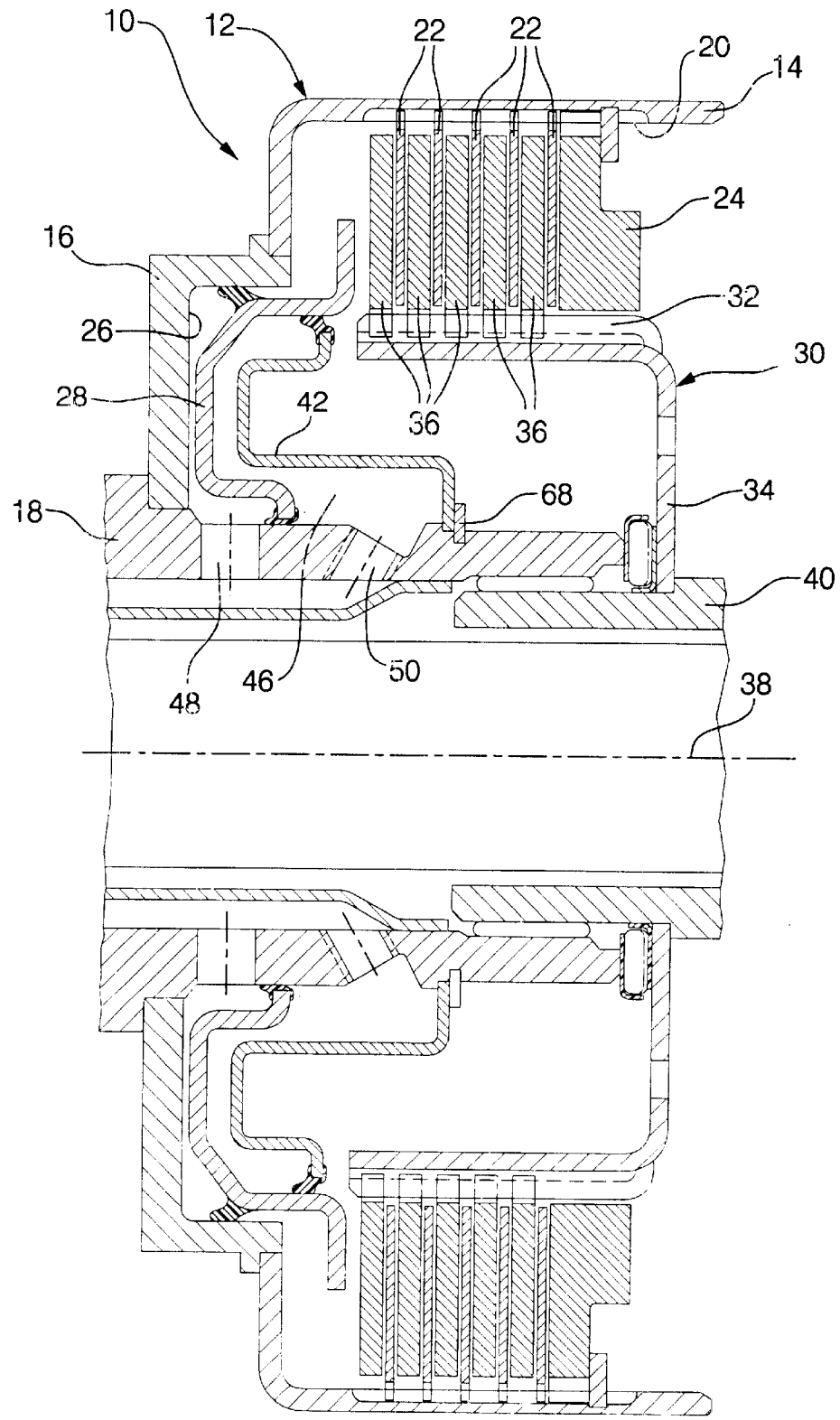
FIG. 1 is an elevational view, in section, of a torque transmitting mechanism in an automatic shifting power transmission.
Figure 2:
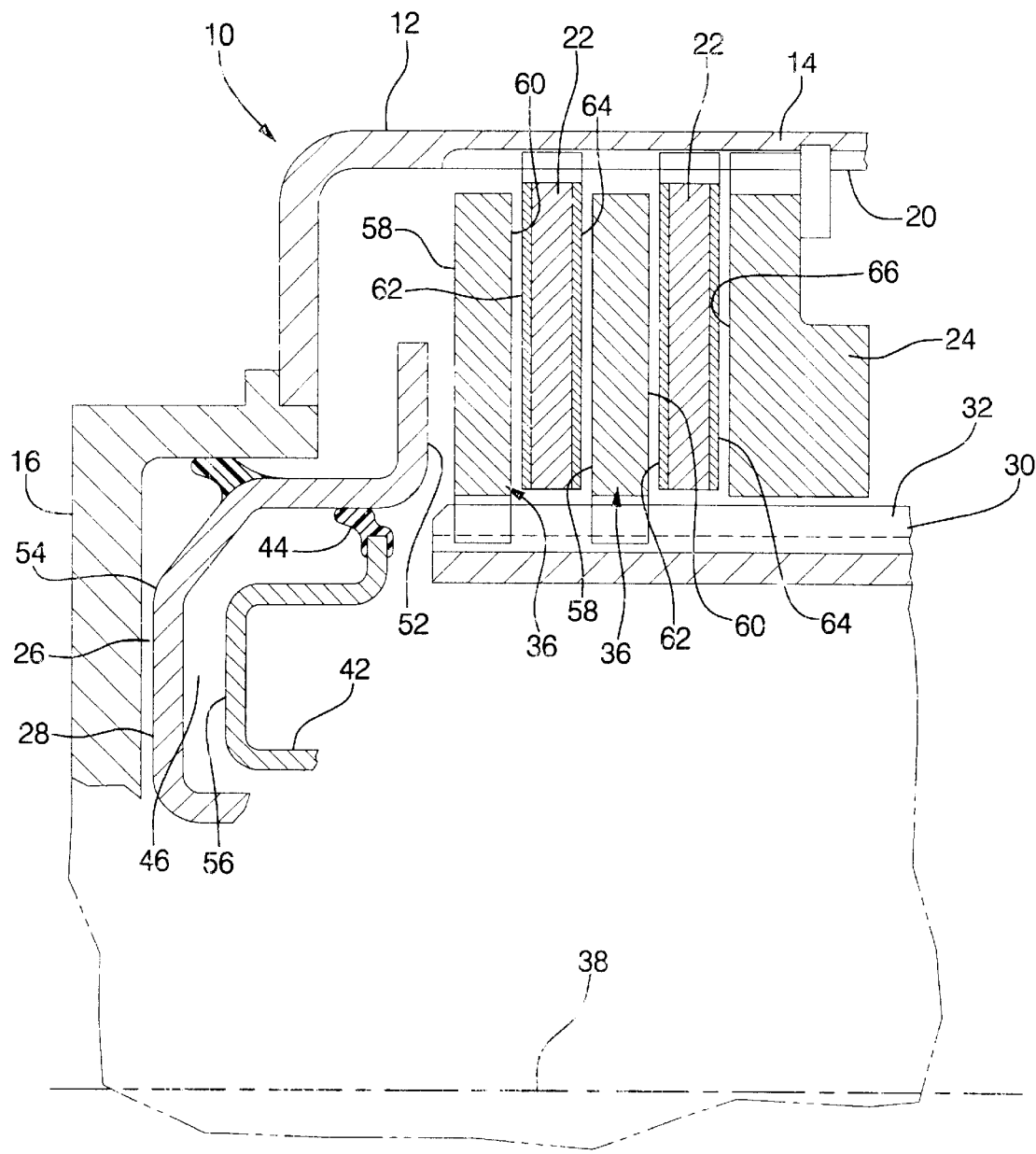
FIG. 2 is an enlarged view of a portion of the torque transmitting mechanism shown in FIG. 1.

Referring to the drawings wherein like characters represent the same or corresponding parts throughout the several views, a torque transmitting mechanism 10 is a component of a conventional power transmission, not shown. The torque transmitting mechanism 10 includes a housing 12 having a shell 14 and a hub 16 that is secured to a shaft 18. The shell 14 has a splined inner surface 20 that is drivingly connected to a plurality of splined friction plates 22 and a splined backing plate 24. The hub 16 has formed therein a cavity 26 in which is slidably mounted an apply piston 28. The apply piston 28, friction plates 22 and backing plate 24 rotate in unison with the shaft 18.

The torque transmitting mechanism 10 also includes a hub 30 comprised of a splined cylindrical portion 32 and an annular wall portion 34. The splined cylindrical portion 32 is drivingly connected with a plurality of splined friction plates 36 that are alternately spaced with the friction plates 22 along the longitudinal axis 38 of the torque transmitting mechanism 10. The annular wall portion 34 is secured to a shaft 40 such that the hub 30 and the friction plates 36 rotate in unison with the shaft 40. Either the housing 12 or the hub 30 can function as an input member for the torque transmitting mechanism and the other will function as an output member.

A dam wall 42, disposed within the piston 28, has an annular seal 44 that sealingly engages an inner surface 52 of the piston 28 to form a balance chamber 46. The cavity 26 is connected with a selectively operable fluid source, not shown, through a passage 48 formed in the shaft 18. Pressurized fluid is supplied through the passage, in a well-known manner, to enforce axial movement of the piston 28 toward the friction plates 22 and 36 to engage the torque transmitting mechanism 10. The balance chamber 46 communicates with lubrication fluid through a passage 50. The fluid in the balance chamber 46 is subjected to centrifugal forces to balance the centrifugal forces of the fluid in the cavity 26. When the cavity 26 is pressurized, the piston will enforce frictional engagement between the friction plates 22 and 36 such that the shafts 18 and 40 will be drivingly connected. If the torque transmitting mechanism 10 is operating as a clutch, the shafts 18 and 40 will rotate in unison; if the torque transmitting mechanism 10 is operating as a brake, the shafts 18 and 40 will be held stationary.

The piston 28 has a magnetic north pole on the right face 52 thereof and a south pole on the left face 54 thereof. The dam wall 42 has a magnetic north pole on the left face 56 such that a repelling force is present between the dam wall 42 and the piston 28. When the cavity 26 is not pressurized, the magnetic repelling force will cause the piston 28 to move leftward, thereby disengaging frictional contact between the friction plates 22 and 36 of the torque transmitting mechanism 10. Each of the friction plates 36 has a magnetic north pole on the left annular face 58 and a magnetic south pole on the right annular face 60. Each of the friction plates 22 has a magnetic south pole on the left annular face 62 and a magnetic north pole on the right annular face 64. The backing plate 24 has a magnetic north pole on the left annular face 66.

Those skilled in the art will be aware that like magnetic poles or polarity repel and opposite magnetic poles or polarity attract. Thus, the friction plates 22 will repel or urge separation from the friction plates 36 and the backing plate 24. The friction plate 36 at the left end of the torque transmitting mechanism 10 will repel or urge separation from the piston 28. In the alternative, another friction plate 22 can be placed adjacent the piston 28. In that case, the plate 22 and the piston 28 would have annular faces with like magnetic polarity. The balance dam 42 is prevented from moving rightward by a locating ring 68 such that the like magnetic poles 56 and 52 will urge the piston leftward to a fully-disengaged position when the cavity 26 is not pressurized. Whenever the cavity 26 is not pressurized, the torque transmitting mechanism is released and the magnetic properties will enforce separation of the adjacent components of the torque transmitting mechanism to thereby improve the efficiency of the transmission by reducing the spin losses in the transmission. Since a conventional transmission will incorporate four or more torque transmitting mechanisms, the efficiency improvement will be significant.

The torque transmitting mechanism, as previously stated, can be either a clutch or a brake. A brake and some clutches will not need a balance dam, so a simple plate without a seal element will suffice in place of the balance dam 42. The magnetic field strengths for the friction plates and piston can be suitably calculated to realize the desired separation forces and gaps and the maximum force needed to be overcome to initiate engagement of the torque transmitting mechanism. With either type of torque transmitting mechanism, the return spring assembly is eliminated, thereby reducing the weight and complexity of the transmission assembly.

Several options exist for providing the magnetic field required for operation of the system. One option is to permanently magnetize the entire friction plate to attain a level of uniform force distribution. Another option is to strategically locate permanent magnets in the friction plates to serve as a source for the magnetic flux that would permeate the friction plates, made of magnetizable material, to provide a reasonable level of uniform force distribution. Yet another option is to rely on strategically-placed permanent magnets to provide the repelling force without relying on the entire plate surface, and the friction plates could be made of nonmagnetic material. Still another option is to manufacture the friction plates with a hybrid material comprising a layer of magnetic material and a layer of nonmagnetic material. This last option would fit well with the current manufacturing practice of some friction plates wherein the friction facing, bonded to a metal core, is nonmagnetic.

For simplicity, the plates have been shown and described as having magnets of like polarity on one side face. However, it is possible to provide magnets with opposite polarities on the same side face, provided that the opposed polarities of adjacent faces are properly aligned. For example, magnets with a north polarity can be affixed to a friction plate at a radially outward location and magnets with a south polarity can be affixed to the same friction plate at a radially inward location. The specific polarity of the magnets on any given face is not a requirement as the north and south polarity can be consistently interchanged provided the polar opposition is maintained between plates.

What is claimed is:

1. A torque transmitting mechanism for use in a power transmission comprising:

an input member;

an output member;

a first plurality of friction plates drivingly connected with said input member, each of said first friction plates having an axial facing magnetic north pole and an axial facing magnetic south pole on opposite annular faces thereof;

a second plurality of friction plates drivingly connected with said output member and being alternately arranged with respect to said first friction plates, each of said second friction plates having an axial facing magnetic north pole and an axial facing magnetic south pole on opposite annular faces thereof with said north magnetic pole facing said north magnetic pole of an adjacent one of said first friction plates and said south magnetic pole facing another adjacent one of said first friction plates; and a fluid operated apply piston slidably disposed in a cavity formed in one of said input and output members and being selectively pressurized to enforce frictional engagement of adjacent pairs of said first and second friction plates, said magnetic poles enforcing axial separation of said friction plates when said piston is not selectively pressurized.

2. The torque transmitting mechanism defined in claim 1 further comprising:

said piston having a magnetized annular face having the same magnetic polarity as a magnetized face on an adjacent one of said first or second friction plates.

3. The torque transmitting mechanism defined in claim 2 further comprising:

a wall member positioned axially adjacent and spaced from a portion of said piston and including an annular magnetized face having the same magnetic polarity as said magnetized annular face of said piston.

4. The torque transmitting mechanism defined in claim 1 further comprising:

a backing plate disposed axially adjacent one of said first and second friction plates and being drivingly connected with said same input or output member, said backing plate having an annular face disposed axially adjacent the annular face of said one friction plate and having a magnetic polarity the same as the adjacent annular face.

5. The torque transmitting mechanism defined in claim 1 further comprising:

each of said first and second friction plates having a plurality of both north and south polarity magnets disposed thereon at locations on the annular face thereof axially alignable with like polarity magnets on adjacent annular faces of the other of the second and first plate, respectively.

* * * * *